United States Patent [19]

Astle

[11] Patent Number: 4,459,883
[45] Date of Patent: Jul. 17, 1984

[54] PORTABLE MACHINE TOOL FOR PREPARING PIPE JOINTS FOR WELDING

[75] Inventor: William H. Astle, Rancho Cordova, Calif.

[73] Assignee: Tri Tool, Inc., Rancho Cordova, Calif.

[21] Appl. No.: 345,744

[22] Filed: Feb. 4, 1982

[51] Int. Cl.³ .............................................. B23B 5/16
[52] U.S. Cl. .................................................... 82/4 C
[58] Field of Search ................ 82/4 R, 4 C; 144/205; 408/82

[56] References Cited

U.S. PATENT DOCUMENTS

| | | | |
|---|---|---|---|
| 1,719,599 | 7/1929 | Dickson | 82/4 R |
| 1,972,022 | 7/1931 | Le May | |
| 2,181,450 | 11/1939 | Davenport | 82/4 R |
| 2,227,348 | 12/1940 | Johnson | |
| 3,051,059 | 8/1962 | Davey | 408/82 |
| 3,228,268 | 9/1963 | Strout | |
| 3,229,555 | 1/1966 | Castles | 82/4 R |
| 3,875,832 | 4/1975 | Mayfield | 82/4 C |
| 3,982,451 | 9/1976 | Gilmore | 82/4 C |
| 4,257,289 | 3/1981 | Groothius | 82/4 C |
| 4,364,290 | 12/1982 | Astle | 82/4 C |
| 4,365,528 | 12/1982 | Astle | 82/4 C |

Primary Examiner—Leonidas Vlachos
Assistant Examiner—Jerry Kearns
Attorney, Agent, or Firm—Bacon & Thomas

[57] ABSTRACT

A portable machine tool for cutting pipe ends located within a confined area includes separable motor and tool housings, a mandrel and associated support shaft for coupling the tool to the pipe workpiece, a rotable cutter head movable coaxially around and axially along the mandrel support shaft for feeding the tool towards the workpiece, and a feed actuator arrangement that presents a very slim cross-sectional profile for the tool, the feed actuator including a thumb wheel that can be manipulated when the motor housing is grasped.

1 Claim, 6 Drawing Figures

PORTABLE MACHINE TOOL FOR PREPARING PIPE JOINTS FOR WELDING

TECHNICAL FIELD OF THE INVENTION

This invention relates to portable machine tools generally known as portable pipe end prepartion or cutting tools used to machine pipe end areas in preparation for welding.

BACKGROUND OF THE INVENTION

This invention embodies a portable machine tool for preparing pipe end areas for welding that is designed for use in areas where space is extremely limited to where access to the work area is only available through a restricted access opening. While portable tools for machining metal pipe joint areas are generally known in the prior art, for example, as exemplified in U.S. Pat. No. 1,972,022 issued to C. LeMay in 1934 and No. 2,227,348 issued to J. L. Johnson in 1940, the prior art apparatus characteristically is not designed to take into consideration operating requirements under severally restricted space limitations or where access to the work zone is only available through a restricted access opening.

For example, a need has been observed for machining the ends of feed pipes that are to be welded inside a header of a heat exchanger or boiler. Access to the interior of the header is only available through access openings designed for inspecting the interior of the header, which openings are not much larger than the size of a person's hand, e.g., about four inches (10 cm) across. The header itself may be less than one foot (30 cm) in interior diameter and the pipe end that must be machined is located in the side wall of the header. The machining operation must be carried out from within the header, since it is desired to weld the end of the pipe to the adjacent header wall in which the pipe is disposed.

It will thus be evident that a tool useful for operating on the pipe ends under such conditions must be able to pass through the small access opening and thereafter be capable of manipulation into position at the pipe end area by an operator by reaching through the access opening from a position outside the header. Once into position, the tool must be capable of accurately machining the pipe end and the adjacent wall area of the header surrounding the pipe opening to provide a precise and concentric welding area for enabling the use of a precision automatic welder to weld the pipe ends to the header from inside the header.

BRIEF SUMMARY OF THE INVENTION

The present invention relates to a compact, multipart, portable machine tool that is especially suited for use in confined areas that are accessible only through restricted openings, although it is to be understood that the present tool can also be used in open areas, if desired.

The tool in accordance with this invention includes a tool housing assembly and a separable motor drive assembly that also functions as a handle and torque restrainer for the tool when assembled to the tool housing. The tool housing contains or supports an expansible mandrel for engaging the interior of a pipe that is to be machined and for locking the tool in place relative to the pipe end when the mandrel is actuated into an expanded, locked condition. The tool furthermore includes a rotatable cutter head for carrying tool bits that can be fed toward the end area of the pipe through which the tool is coupled by the mandrel. The cutter head may be fed towards or away from the pipe end area by means of a particularly compact and efficient drive mechanism that includes, in the preferred embodiment, a disc-like thumb wheel attached to the tool housing adjacent the point where the drive motor housing is attached to the tool housing and a drive train that enables the use of a tool housing of small dimensions, particularly in a transverse or radial sense relative to the rotational axis of the tool cutters.

The advantages and benefits of the tool made in accordance with the invention will be more evident from the detailed description of the preferred embodiment thereof that now follows.

DESCRIPTION OF THE DRAWINGS

With reference to the appended drawings.

DETAILED DESCRIPTION OF PREFERRED EMBODIMENT OF THE INVENTION

Figure 1:
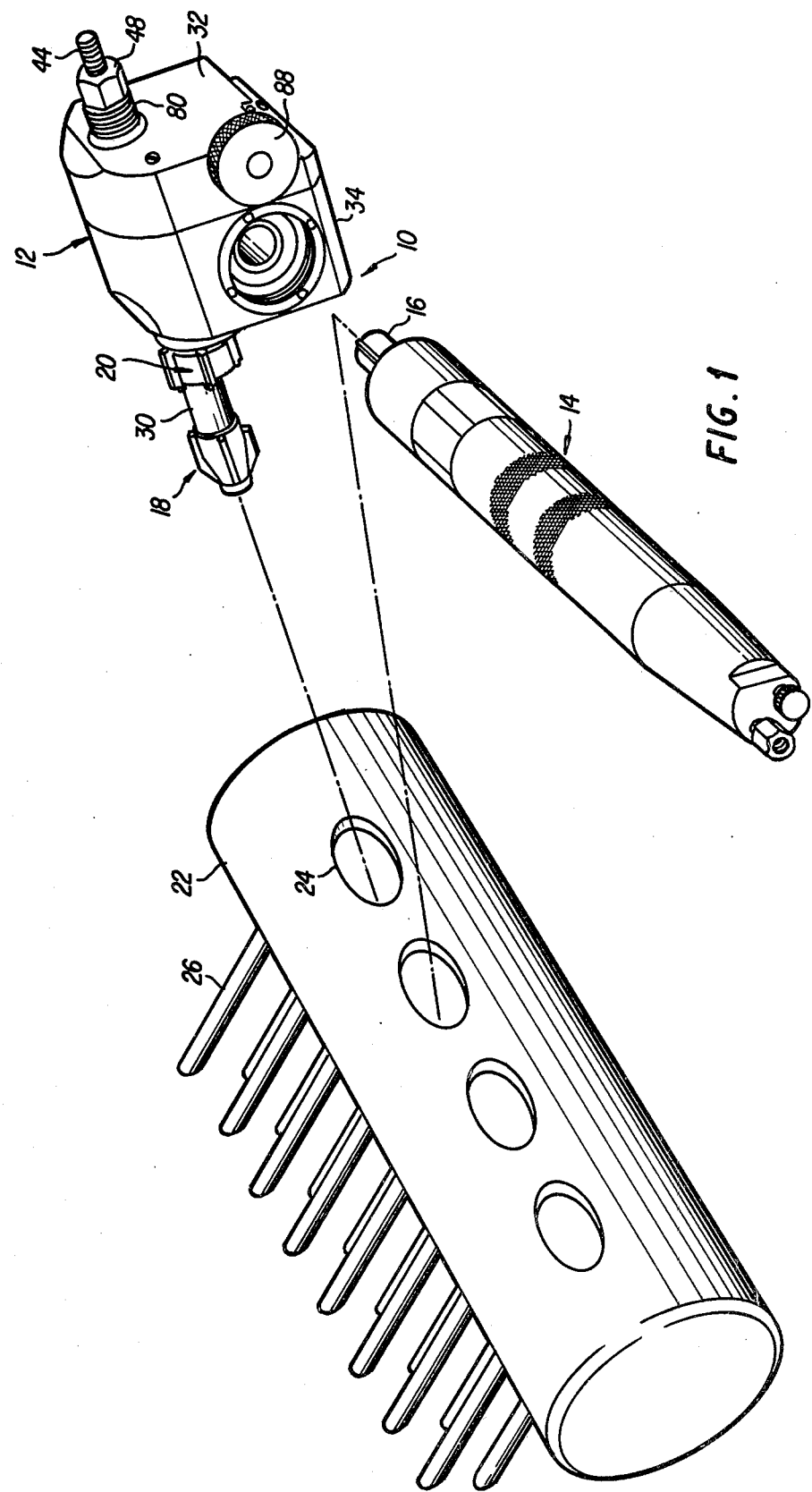
FIG. 1 is an isometric, partially exploded view showing an embodiment of the portable pipe end preparation tool constructed in accordance with my invention in an operating environment which includes a header having limited access openings into its interior.
Figure 3:
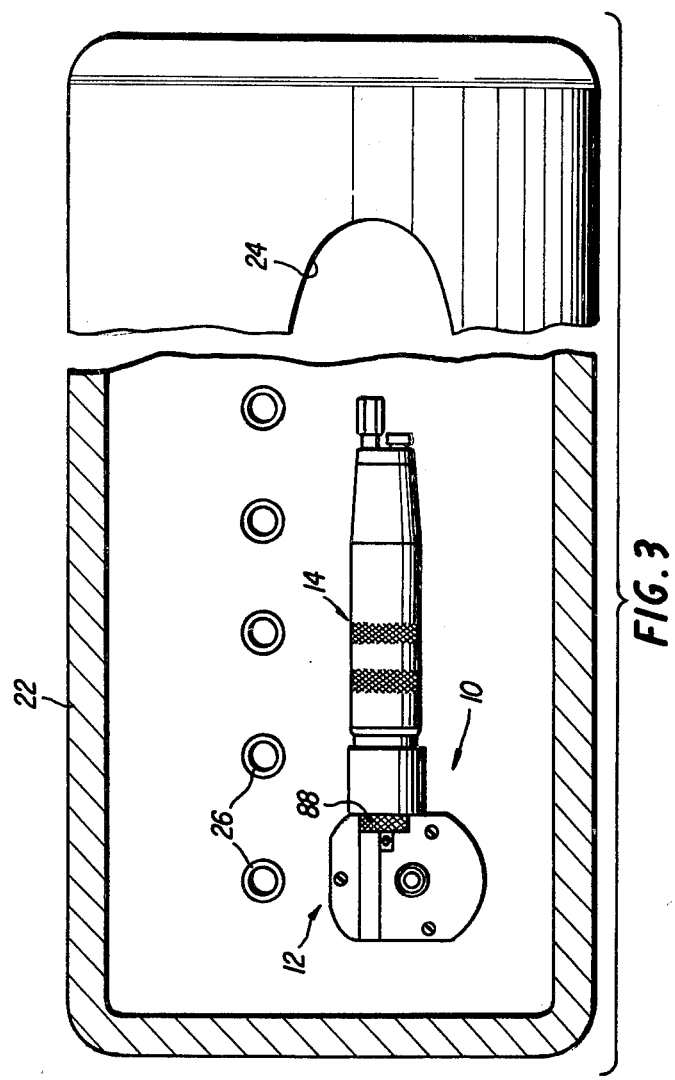
FIG. 3 is a top, partial cutaway view showing the assembled tool inside the header in its approximate operating position.
Figure 2:
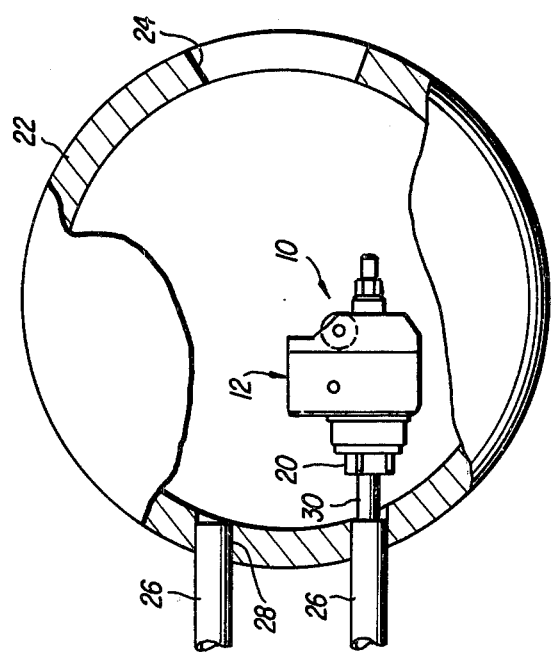
FIG. 2 is an end view showing the tool assembled inside the header in approximate operating position, with parts broken away for clarity.
Figure 5:
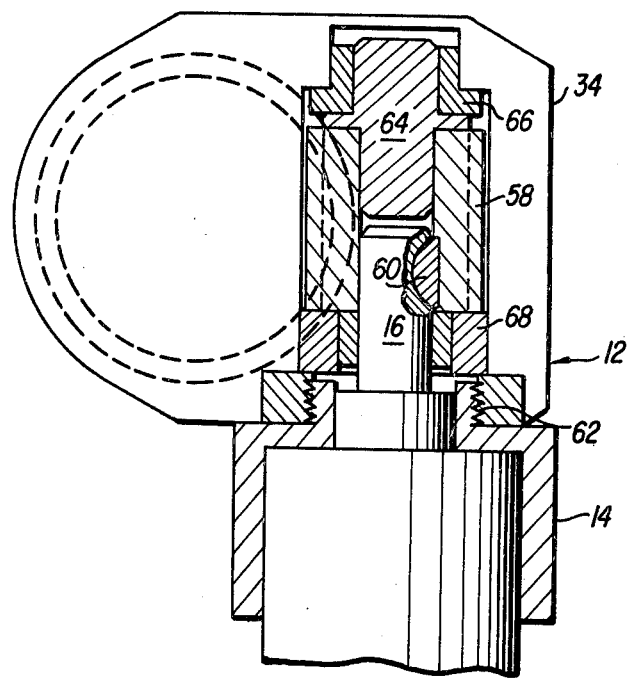
FIG. 5 is a cross-sectional view taken along lines V—V of FIG. 4.

With reference to FIGS. 1, 2 and 3, a portable, pipe end preparation tool for machining end areas in preparation for welding the pipe 2, for example, a header of a heat exchanger or a boiler, is generally indicated by the reference numeral 10. The tool, in its assembled condition, includes the tool housing 12 and a drive motor housing 14. The tool housing 12 and the drive motor housing 14 are arranged to be coupled together as shown in FIG. 3, and for this purpose the end of the drive motor housing 14 includes, for example, screw threads (see FIG. 5) which engage corresponding threads in the housing 12 so that the drive shaft 16 of the drive motor within the housing 14 can engage a drive transmission arrangement within the tool housing 12, all in a manner to be described in more detail below. The tool 10 includes a mandrel 18 for engaging a pipe and for fixing the tool 10 in proper position relative to the pipe end so that cutter bits carried by a tool carrier head can machine the end of the pipe and the surrounding hole in which the pipe is disposed to prepare the assembly for welding.

The tool 10 is particularly intended for use in a work area that is confined or which is accessible through a restricted opening. For example, the tool is particularly adapted for use in a header 22 of a heat exchanger or a boiler and which has access openings 24 of restricted size. For example, a header 22 having an interior diameter on the order of 12 inches (30 cm) and access openings approximately 4 inches (10 cm) across would be a typical environment for which the tool 10 is particularly well suited. It will be evident that such a small access opening 24 would present design restraints on a machine tool that required a transverse cross-section suitable for passing through the access opening yet possessing the required rigidity and ruggedness to withstand the stress of performing continuous machining operations in commercial applications.

Accordingly, the tool 10 incorporates a separable tool housing 12 and motor housing 14 that enables the two sections to be passed through a pair of access openings 24 (or through the same access opening, in sequence) and thereafter assembled with the header to present the configuration as shown in FIG. 3. The drive motor housing 14, in such assembled condition, forms a handle for manipulating the tool into position and/or restraining the torque reaction of the tool during a cutting operation by engaging the side of the header. When the work inside the header has been completed, the motor housing 14 is removed from the tool housing 12 and the two pieces are withdrawn from the access openings in a reverse manner than the initiation of the operation.

As seen in FIGS. 2 and 3, the tool is intended for use in connection with the preparation of the ends of pipes 26 that have previously been force-fitted into openings 28 in the side wall of the header 22. The specific machining operation will be more clearly described in connection with the discussion below of FIG. 4. As is evident from FIG. 2, however, the mandrel 18 has been inserted within a pipe 26 to anchor the tool 10 adjacent the end of the pipe within the header 22. The mandrel serves to lock the tool 10 in this position and thereafter a suitable feed means drives the tool 10 into engagement with the end of the pipe 26 so that the cutters carried by the tool carrier head 20 can perform the desired machining operation in preparation for a welding operation wherein the ends of the pipes 26 are united with the side wall of the header 22 to form an integral union at this area.

The tool 10 is configured so that it has a minimum cross-sectional area in a transverse sense, that is, laterally with respect to the mandrel support shaft 30 (see FIG. 1) that extends longitudinally through the housing 12. The manner in which this is accomplished, while providing interior space within the housing for all of the working parts of the tool, will become more evident from the following description of the other figures in the drawings.

Figure 4:
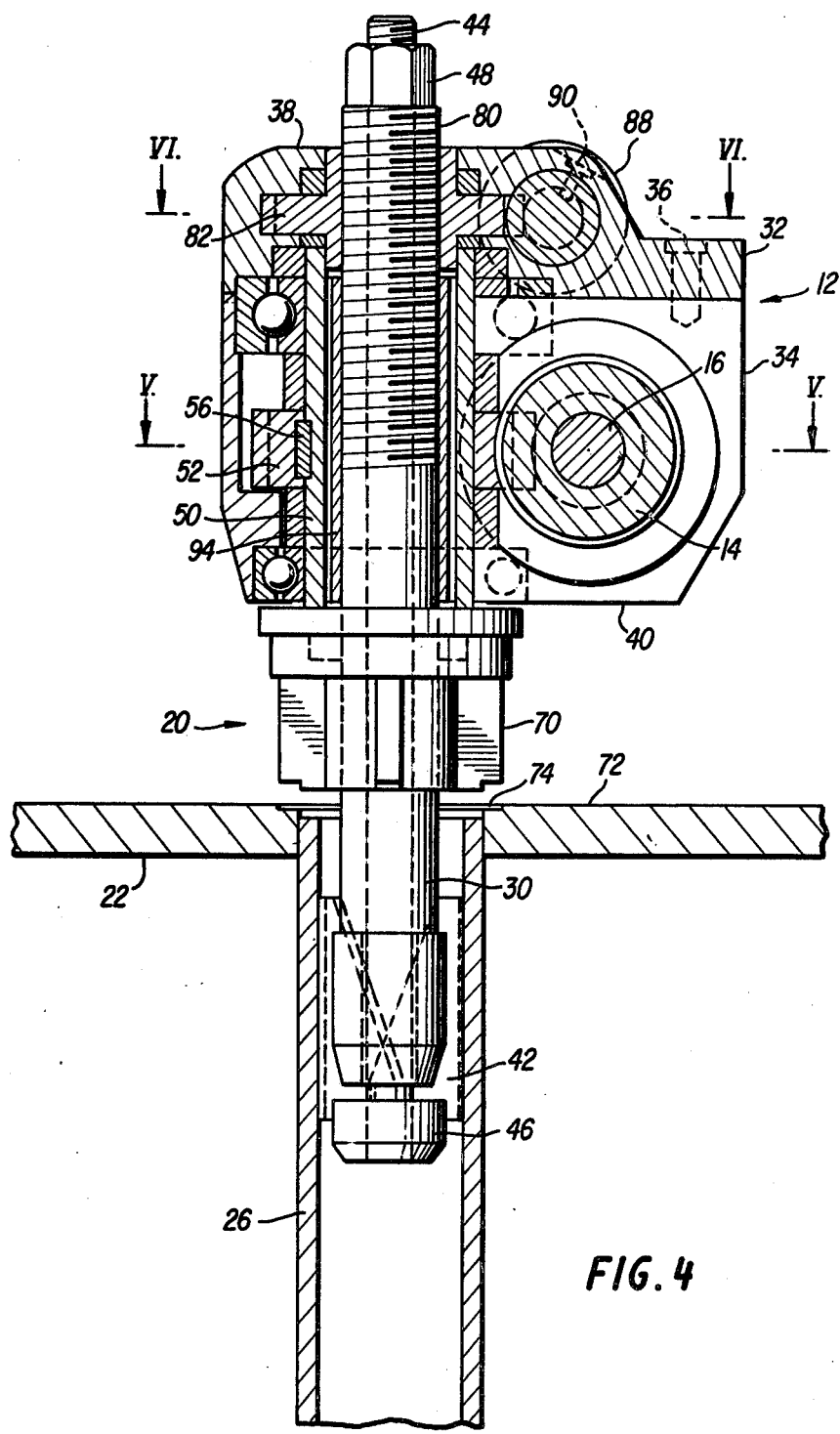
FIG. 4 is a side elevational, partial cross-sectional view of the tool in operating position.

As seen in FIG. 4, the housing 12 is made up in two parts, namely an upper portion 32 and a lower portion 34, the two portions being joined together by suitable fasteners 36. The assembled housing 12 includes a top 38, a bottom 40 and sides connecting the top and bottom and which extend longitudinally and generally parallel with the mandrel support shaft 30, (although some portions of the sides are not necessarily parallel with the shaft 30).

The mandrel support shaft 30 extends longitudinally through the housing 12 and at its distal end includes radially extendable mandrel blades 42 that are movable along an inclined cam surface (not shown) by means of a draw bolt 44 having a pusher head portion 46 that directly bears against the ends of mandrel blades 42 to cause them to expand radially outwardly to engage the interior of a pipe 26 when the mandrel actuating nut 48 is rotated, all in accordance 12-known principles, for example as shown in U.S. Pat. No. 2,181,450 issued to Davenport in 1939.

Within the lower portion of the housing 34 there is disposed a rotatable tool carrier shaft 50 that is coupled to a ring gear 52 by a key 56 so that rotation of the ring gear 52 causes rotation of the tool carrier shaft 50.

The ring gear 52 in turn is connected to a pinion gear 58 (see FIG. 5) that is connected by key 60 to the drive shaft 16 of the motor within drive motor housing 14. It will be evident from FIG. 5 that the drive motor housing 14 is coupled to the lower portion 34 of the tool housing by means of the threads 62 which provide a rigid connecting arrangement for the drive motor housing 14 and the lower tool housing 34. It will also be evident from FIG. 5 that the ring gear 58 is guided for rotation by a central guide element 64 rotating within a bearing 66. A cooperating bearing 68 is provided for drive shaft 16 in its assembled position in engagement with pinion gear 58. In this manner, a very rigid structural joint is provided that is capable of withstanding the rigors of machine operations within a very compact envelope. It is to be noted that the details of the tool carrier shaft 50 and the ring gear 52 have been omitted from FIG. 5 for clarity.

The tool carrier shaft 50 is connected to the tool carrier head 20 in driving relationship, whereby rotation of the drive motor shaft 16 causes rotation of the pinion gear 58 and rotation of the ring gear 52 to cause rotary motion of tool carrier shaft 50 and tool carrier head 20 located at the distal end of the tool carrier shaft 50. Both the tool carrier shaft and the tool carrier head 20 rotate coaxially about the mandrel support shaft 30, and suitable bearing structure within the housing 34 is provided to guide the shaft 50 in rotary motion and to react operational loads from the shaft 50 into the housing 34.

The tool carrier head 20 is provided with cutter bits 70 that may be locked into slots provided within the cutter head 20 or simply brazed thereto as an integral assembly. The ends of the cutter bits 70 are configured to machine the ends of the pipes 26 to a precise depth from the interior surface 72 of header 22 and to also provide a machine surface 74 surrounding the annular opening in the header 22 into which the pipe 26 has been force-fitted. This enables the use of precise automatic welding equipment within the head 22, since the cut made by the tool bit 70 will be precisely concentric with the pipe 26 and a machine surface 74 on the interior of header 72 will be available for indexing and guiding the automatic welding equipment (not illustrated here). The welding operation entails the joining together of the ends of pipe 26 with the header material to provide a fluid tight connection between the pipe 26 and the header 22.

Figure 6:
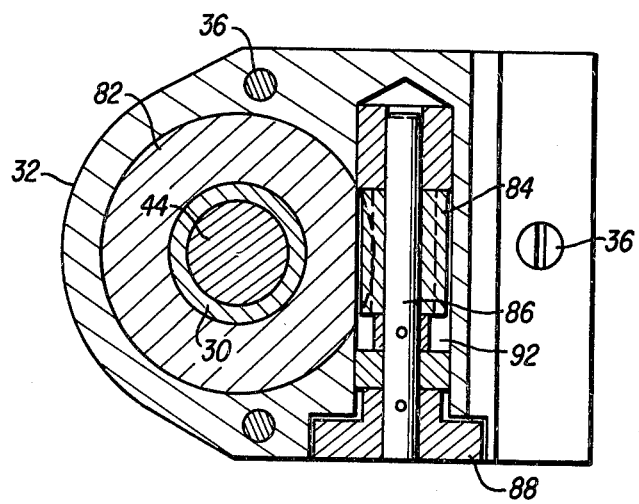
FIG. 6 is a sectional view taken along lines VI—VI of FIG. 4.

The structure whereby the tool carrier 20 may be fed towards or away from the end of pipe 26 will now be described. With reference to FIGS. 4 and 6, the mandrel support shaft 30 is provided with exterior thread 80 over at least a portion of its proximal end located near the top 38 of the upper portion 32 of the tool housing 12. The mandrel support shaft 30 is hollow to accommodate the mandrel draw bolt 44 coaxially through its central area whereby the bolt 44 can be moved axially to cause radial movement of the mandrel blades 42 when the mandrel nut 48 is rotated. The mandrel nut reacts against the proximal end of the mandrel support shaft 30 to cause the desired actuation of the mandrel blades 42 whereby the can be moved into engagement with the interior of pipe 26.

The mandrel shaft 30 is coupled by means of its thread 80 to a dual feed drive gear 82 that is coupled to a pinion gear 84 carried by a feed drive shaft 86 and which is held against rotation relative to the drive shaft 86 by a suitable key (not shown). The feed drive shaft 86 is connected to a feed actuator thumb wheel 88 which is disposed relative to the housing 32 so that the thumb wheel lies within the boundaries defined by the outer peripheral sides of the housing 32, with only a limited rim portion of the thumb wheel projecting beyond the top of the housing (see FIG. 4 where the position of the thumb wheel 88 relative to the housing portion 32 is illustrated). This provides a cross-sectional profile of the tool housing 12 that is smooth and compact to enable the housing to pass through an access opening of the header 24. Moreover, it will be observed from FIGS. 4, 5 and 6 that the drive shaft 16 of the drive motor and the feed actuator shaft 86 are parallel to each other and closely spaced apart so that an operator manipulating the drive motor housing 14 can readily move the feed actuator thumb wheel 88 with a single hand simply by extending his thumb to engage the thumb wheel 88 while his fingers and the remainder of his hand engage the motor housing 14. This provides a very compact arrangement of elements that enables the tool to perform exceptionally well in confined areas or areas accessible only through restricted openings. The overall layout of the drive shaft moreover enables construction of a tool housing having minimum cross-sectional while still providing adequate strength to react loads incurred during operation of the tool.

As an added feature, it will be noted that the upper portion 32 of the housing 12 contains, as a separate assembly, the feed pinion gear 84, the feed actuator shaft 86 and the thumb wheel 88. It will be evident that, upon removal of the fasteners 36, the upper portion of the housing 32 can readily be removed from the mandrel support shaft 30 by rotation of the feed gear 82 and the entire feed actuator assembly is retained together as a separate unit. This provides a very compact configuration that enables easy maintenance of the tool.

For retaining the feed actuator shaft 86 within the housing portion 32, a suitable set screw 90 can be used, the screw extending into the area 92 shown in FIG. 6 for retaining the shaft 86 in assembled condition in housing portion 32.

To feed the tool carrier head 20 into engagement with the end of pipe 26, it will be apparent that rotation of the thumb wheel 88 will cause rotation of the pinion gear 84 and the feed ring gear 82. Rotation of gear 82 will cause axial movement of the tool housing 12 along mandrel support shaft 30 to cause the cutters 70 to engage the end of the pipe 26 and the interior surface 72 of header 22. A suitable sleeve bearing 94 is provided to enable the housing 12, and in particular the lower portion 34 of the housing 12, to slide axially along the mandrel support shaft 30.

It is to be understood that the above description is of a preferred embodiment only of the invention and that structural variations of the inventive concept could be made without departing from the spirit and scope of the invention, which is to be limited only by the claims appended below.

I claim:

1. A portable pipe end preparation tool adapted for use within a confined area comprising:

a tool housing having a top, sides and a bottom;

a mandrel support shaft extending axially through and projecting at its distal end beyond the bottom of the housing;

expandable mandrel means for radially gripping a pipe interior at the distal end area of the mandrel support shaft;

a mandrel actuator for moving the mandrel radially outwardly, the mandrel actuator being connected to the mandrel support shaft and operable from the proximal end of the mandrel support shaft which is located adjacent the top of the housing;

a rotatable tool carrier shaft carried by the housing, the tool carrier shaft extending coaxially with the mandrel support shaft and projecting at its distal end outwardly of the housing, the tool carrier shaft and tool housing being supported for tool feed movement axially along the mandrel support shaft and being rotatable relative thereto;

a tool carrier head connected to the distal end area of the tool carrier shaft and rotatable therewith;

a tool feed drive means connected to the mandrel support shaft and supported by the tool housing so that the tool feed drive means is able to transmit axial feed motion to the housing and tool carrier shaft relative to the mandrel support shaft;

a tool feed actuator shaft connected to the top end area of the housing and extending substantially perpendicular to the tool carrier shaft, the tool feed actuator shaft connected to the tool feed drive means within the housing for transmitting feed motion to the tool feed drive means;

a tool feed actuator connected to the tool feed actuator shaft and disposed relative to the housing so that the tool actuator lies within the boundaries defined by the outer peripheral sides of the housing with only a limited portion of the tool feed actuator projecting beyond the top of the housing;

a drive motor for the tool including a drive motor housing and an axially extending motor drive shaft;

means for detachably securing the motor housing to the tool housing with the motor drive shaft extending parallel to and below the tool feed actuator shaft when the motor housing and tool housing are connected together;

means for coupling the motor drive shaft to the tool carrier shaft when the drive motor is secured to the housing for transmitting rotary motion of the latter to the former;

said tool feed drive means comprising a ring gear threadedly coupled to the mandrel support shaft at its proximal end area and rotatable about the tool carrier shaft to cause axial motion of the housing relative to the mandrel support shaft; and said tool feed actuator shaft including a rotary pinion gear coupled to the ring gear;

said tool feed actuator comprising a disc-like thumb wheel lying in a plane extending normal to the tool feed drive shaft and being rotatable about the axis of said tool feed drive shaft; said limited portion of said tool feed actuator comprising a rim segment of said thumb wheel;

said housing comprising upper and lower portions connected by removable fasteners; said upper portion supporting and containing said tool feed and drive means, said tool feed actuator shaft, and said tool feed actuator as a single assembly separable from the lower housing portion;

said drive motor housing comprising a manipulating means for the tool and motor housing assembly, and said thumb wheel being oriented and spaced from said drive motor housing in a manner enabling operation of the thumb wheel by a single hand while the hand is grasping the drive motor housing; and said means for coupling the motor drive shaft to the tool carrier shaft comprising a pinion and ring gear set, the pinion being rotatable about an axis extending coaxially with the rotational axis of the motor drive shaft, and the ring gear being connected to and rotatable coaxially with the tool carrier shaft.

* * * * *